United States Patent

Addeo et al.

[11] Patent Number: 5,271,057
[45] Date of Patent: Dec. 14, 1993

[54] AUDIO PROCESSING SYSTEM FOR TELECONFERENCING SYSTEM

[75] Inventors: Eric J. Addeo, Long Valley; Joseph J. Desmarias; Gennady Shtirmer, both of Morris Plains, all of N.J.

[73] Assignee: Bell Communications Research, Inc., Livingston, N.J.

[21] Appl. No.: 774,085

[22] Filed: Oct. 9, 1991

[51] Int. Cl.⁵ .................................................. H04M 1/20
[52] U.S. Cl. ..................................... 379/202; 379/390; 379/392; 379/406
[58] Field of Search .................. 379/53, 54, 202, 158, 379/390, 392, 395, 406, 410, 388; 381/83

[56] References Cited

U.S. PATENT DOCUMENTS

| | | | |
|---|---|---|---|
| 3,183,304 | 5/1965 | Schroeder | 381/83 |
| 3,622,714 | 11/1971 | Berkeley et al. | 379/399 |
| 3,973,086 | 8/1976 | May, Jr. | 379/406 |
| 4,008,376 | 2/1977 | Flanagan et al. | 379/389 |
| 4,029,912 | 7/1988 | Geigel et al. | 379/406 |
| 4,253,000 | 2/1981 | Kasson | 379/202 |
| 4,644,108 | 2/1987 | Crouse et al. | 379/406 |
| 4,670,903 | 6/1987 | Araseki et al. | 379/410 |
| 4,748,663 | 5/1988 | Phillips et al. | 379/388 |
| 4,982,425 | 1/1991 | Yoshida | 379/390 |
| 4,991,166 | 2/1991 | Julstrom | 370/32.1 |
| 4,991,167 | 2/1991 | Petri et al. | 370/32.1 |
| 5,029,162 | 7/1991 | Epps | 370/77 |

OTHER PUBLICATIONS

G. Hill, "Improving Audio Quality: Echo Control in Videoconferencing", Teleconference, Mar.-Apr. 1991, vol. 10, No. 2., pp. 29-43.
W. Armbruster, "High Quality Hands-Free Telephony Using Voice Switching Optimised With Echo Cancellation", Signal Processing IV, 1988, J. L. Lacoume et al. (eds.), Elsevier Science Publishers, B. V., pp. 495-498.
F. K. Harvey et al., "Some Aspects of Stereophony Applicable to Conference Use", Journal Audio Engineering Society, Jul. 1963, vol. 11, pp. 212-217.

*Primary Examiner*—James L. Dwyer
*Assistant Examiner*—Ahmad F. Matar
*Attorney, Agent, or Firm*—Leonard Charles Suchyta; Loria B. Yeadon

[57] ABSTRACT

An audio processing system (100) for use in a teleconferencing system (10) utilizes complementary comb filters (42, 52, 220, 320) in combination with an echo suppressor (210, 310) and/or a frequency scaler (60, 120) to substantially improve acoustic stability margin and reduce far-end talker echo.

8 Claims, 4 Drawing Sheets

AUDIO PROCESSING SYSTEM FOR TELECONFERENCING SYSTEM

FIELD OF THE INVENTION

The present invention relates to a teleconferencing system. Specifically, the present invention relates to an audio processing system for use in a teleconferencing system. The inventive audio processing system provides high quality speech transmission capability for fully interactive two-way audio communications. The inventive audio processing system is easy to implement, and in comparison to prior art systems, has an increased margin against acoustic instability and reduced far-end talker echo.

BACKGROUND OF THE INVENTION

The goal of a teleconferencing system is to bring the participants at the ends of the communication as "close together" as possible. Ideally, the effect obtained in good communication should be one of "being there" (See, e.g., U.S. Pat. No. 4,890,314), describing a teleconferencing system including teleconferencing stations which utilize a high resolution display.

A teleconferencing system comprises two or more remotely located stations which are interconnected by a transmission system. Two teleconference participants located at the two remote stations are in audio and video communication with each other. To accomplish the audio and video communication, each station includes a microphone for generating an audio signal for transmission to the other station, a speaker for receiving an audio signal from the other station, a video camera for generating a video signal for transmission to the other station and a display apparatus for displaying a video signal generated at the other station. Each station also includes a codec for coding the video signal generated at the station for transmission in a compressed fashion to the other station and for decoding a coded video signal received from the other station.

The present invention relates to the audio processing portion of the teleconferencing system. The audio processing portion may be viewed as comprising a first microphone and a first speaker located at a first station and a second microphone and a second speaker located at a second station. A first channel is established in a transmission system for transmitting an audio signal from the first microphone at the first station to the second speaker at the second station. A second channel is established in the transmission system for transmitting an audio signal from the second microphone at the second station to the first speaker at the first station.

A problem with this type of audio system is acoustic coupling between the microphone and the speaker at each station. In particular, there is a round-trip feedback loop which, for example, is formed by: 1) the first microphone at the first station, 2) the channel connecting the first microphone to the second speaker at the second station, 3) the acoustic coupling path at the second station between the second speaker and the second microphone, 4) the channel connecting the second microphone and the first speaker at the first station, and 5) the acoustic coupling path at the first station between the first speaker and the first microphone. If at any time, the net loop gain is greater than unity, the loop becomes unstable and may oscillate. The result of this instability is the well-known "howling" sound. In such loops, even when the overall gain is low, there is still the problem of far-end talker echo, which stems from a speaker's voice returning to his ear, at a reduced but audible level, after traveling around the loop. The acoustic echo problem worsens in teleconferencing systems as the transmission delay increases. Incompletely suppressed echoes which are not distinguishable to a speaker at short transmission delays, become more distinguishable with longer transmission delays.

A variety of solutions have been proposed in the prior art for the problems of acoustic instability and acoustic echoes (see, e.g., G. Hill, "Improving Audio Quality Echo Control in Video Conferencing", Teleconference, Vol. 10, No. 2, March-April 1991; and W. Armbruster, "High Quality Hands-Free Telephony Using Voice Switching Optimized With Echo Cancellation", Signal Processing IV, J. L. Lacoume, et al, editors, Elsevier Science Publishers, B. V., 1988, pp. 495-498).

One approach to solving the echo problem in the audio processing loop of a teleconferencing system is to use an echo canceller. An echo canceller is a circuit which produces a synthetic replica of an actual echo contained in an incoming signal. The synthetic replica is subtracted from the incoming signal to cancel out the actual echo contained in the incoming signal. The echo canceller may be implemented by an adaptive transversal filter whose tap values are continuously updated using, for example, a least mean square algorithm to mimic the transfer function of the actual echo path. This type of echo canceller suffers from a number of disadvantages. First, the echo canceller is computationally complex, i.e., it requires the use of a significant number of specialized Digital Signal Processors for implementation. Second, for wideband speech (7 KHz), in rooms with a large reverberation time, the echo canceller requires a long transversal filter with about 4000 or more taps. Such long filters have a low convergence rate and poorly track the transfer function of the actual echo path. In addition, some echo cancellers implemented using an adaptive transversal filter must be trained with a white noise training sequence at the beginning of each teleconference. Retraining may be required during the course of the teleconference.

Another technique for solving the echo problem is to place an echo suppressor at the output of the microphone at each teleconferencing station. Typically, the echo suppressor comprises a level activated switch which controls a gate and a variable attenuation device. When the signal level at the output of a microphone is below a threshold level, a gate is closed to block the communication channel leading away from the microphone. When the signal level at the output of the microphone is above a threshold level, the gate is open to place the communication channel leading away from the microphone into a pass state. Illustratively, the threshold level of the echo suppressor may be set to the maximum level of the return echo. For this system, when one teleconference participant is talking, his local echo suppressor opens the local gate so that the channel to the remote station is open. If the other teleconference participant at the remote station is not also talking, the echo suppressor at the remote station closes the gate at the remote station so that the echo return path is blocked. Some echo suppressors open or close the gate to open the communication channel by detecting the presence or absence of local speech rather than by simply determining if a microphone output signal is above or below a threshold.

When the participants at both ends of the teleconference try to speak at the same time, a condition known as double talk exists. The echo suppressor gates at both ends of the teleconference are open and there is the possibility of acoustic echo being returned to both participants as well as the possibility of acoustic instability. In this case, each echo suppressor utilizes its variable attenuation device to introduce the amount of attenuation necessary to suppress the acoustic echo. Thus, the echo is reduced but so is the audio signal generated by the speech of the teleconference participants. In many cases, the amount of attenuation which has to be introduced at the output of each microphone for echo suppression may be too great to maintain full duplex two-way communication between participants. Thus, this type of echo suppressor is not entirely satisfactory for use in a teleconferencing system.

In addition to the use of echo suppressors and echo cancellers, frequency shifters or special filters may be utilized in the audio processing system of a teleconferencing system. For example, a frequency shifter may be utilized to increase the margin against acoustic instability (see, e.g., U.S. Pat. No. 3,183,304, and F. K. Harvey et al, "Some Aspects of Stereophony Applicable to Conference Use", Journal Audio Engineering Society, Vol. 11, pp. 212-217, July 1963).

Alternatively, comb filters with complementary pass and stop bands may be placed in the two audio channels connecting the two stations of a teleconference (see, e.g, U.S. Pat. No. 3,622,714 and U.S. Pat. No. 4,991,167). The use of the complementary comb filters mitigates the effect of acoustic coupling between the speaker and microphone at each station. The reason is that any signal going around the feedback loop is processed by both comb filters and will be attenuated across its entire spectrum as the stop bands of the two comb filters are complementary. This improves the margin against acoustic instability to some extent and reduces far-end talker echo. On the other hand a speech signal which travels from one station to the other is only processed by one comb filter and is not attenuated appreciably across its entire spectrum. In comparison to echo cancellers, comb filters have the advantage of simplicity. However, comb filters introduce some degradation in perceived speech quality and do not always provide a sufficient margin against acoustic instability. The reason for this is that the frequency response of a room in which the microphone and speaker of a station are located is characterized by a large number of resonant peaks which are much larger than the average sound level. The nulls in the comb filter transfer function are often not deep enough to suppress the resonant peaks, because if the nulls are too deep the quality of the transmitted audio signal is adversely affected.

In view of the foregoing, it is an object of the present invention to provide an audio processing system for use in a teleconferencing system. Specifically, it is an object of the present invention to provide an audio processing system which permits two-way fully interactive audio communications in a teleconferencing system, while at the same time suppressing far-end talker echoes and providing a satisfactory margin against acoustic instability. Finally, it is an object of the present invention to provide an audio processing system for use in a teleconferencing system which utilizes complementary comb filters, but provides a satisfactory stability margin against acoustic instability and mitigates the degradation in perceived speech quality caused by the comb filters.

SUMMARY OF THE INVENTION

In accordance with an illustrative embodiment of the present invention, to process audio signals, a teleconferencing system comprises a first microphone and a first speaker located at a first station and a second microphone and a second speaker located at a second station. A first comb filter whose transfer function includes a set of alternating pass and stop bands is located in the transmission channel between the first microphone at the first station and the second speaker at the second station. A second comb filter which is complementary to the first comb filter is located in the transmission channel between the second microphone at the second station and the first speaker at the first station. A frequency scaler is located in one of the channels for scaling by a constant factor the frequency spectrum of a signal in the one channel. A frequency scaler is a device which receives an input signal with a frequency domain representation $X(f)$, where f is the frequency domain variable, and outputs a signal having a frequency domain representation $X'(f) = X(\beta f)$ where $\beta$ is a constant.

Illustratively, the center frequencies of the passbands of the comb filters are spaced apart by one-third of an octave. The reason for the one-third octave spacing is to remove harmonic interdependence between bands to prevent the entire spectrum for one speaker from falling into the stop bands of a comb filter. The peak to trough amplitude spacing of the transfer function of the comb filters is about 12 dB. Deeper nulls begin to introduce more substantial impairments in the quality of transmitted speech.

As indicated above, the comb filters alone do not provide an adequate stability margin against acoustic instability. This is because of the frequency response of a room in which the microphone and speaker of a station are located. This frequency response is characterized by a large number of resonant peaks which are much larger than the average sound level. The nulls of the comb filters are not deep enough to suppress these resonances. The frequency scaler breaks up these resonances by introducing changes in the frequency spectrum during each trip an audio signal takes around the feedback loop. The frequency scaler can in particular embodiments add 6 dB of additional stability margin.

The above described audio processing system is suitable for use in low delay (less than 50 msec) transmission systems. At such low delays, echo is not as serious a problem as in longer delay systems therefore allowing the use of relatively shallow comb filters (i.e. about 12 dB). Because shallow comb filters do not degrade speech quality to an extremely large degree they can be inserted permanently into the return audio path leading to each speaker. In larger delay systems, where far-end echoes are a more serious problem, deeper comb filtering may be utilized to achieve greater echo suppression and an increased margin against acoustic instability. Typical peak to trough amplitude spacings of the transfer function of such a deep comb filter may reach 35 dB. This depth of filtering, however, impairs the quality of transmitted speech.

To mitigate the degradation in perceived speech quality caused by the comb filters, the comb filters may be utilized in combination with echo suppressors. In this embodiment of the invention, at each station in a teleconferencing system, there is an echo suppressor connected to the output of the microphone and a dynamic filter connected to the input of the speaker. The dynamic filter may be switched between a pass state and a comb filter state. Specifically, the filter is switched to the pass state only when no local speech is present so that the output channel of the microphone is blocked by the echo suppressor. When local speech is present, causing the output of the microphone to be opened by the echo suppressor, the comb filter is activated and inserted into the return echo path leading to the speaker. When only one participant is speaking, the insertion of the comb filter at the input of the local speaker has little effect because the return echo path is also blocked by the echo suppressor of the participant at the far end who is not speaking. However, during a double talk condition, the comb filters at both teleconferencing stations are activated. This is when the gates associated with the echo suppressors at both ends of the teleconference are open and there is the potential for both acoustic echoes and acoustic instability. In this case wherein both comb filters are activated, a signal must go through both comb filters to travel around the feedback loop so as to be returned as an echo. Because the comb filters are complementary, attenuation of undesired signals is achieved. This embodiment of the invention is advantageous because the comb filters are only active during double talk. Thus, any degradation in speech quality caused by the comb filters occurs only when there is a double talk condition. To achieve an even greater margin of stability, a frequency scaler may be included in one of the channels of the feedback loop.

In short, in accordance with the present invention, an audio processing system of a teleconferencing system utilizes comb filters in combination with echo suppressors and/or a frequency scaler to reduce far-end talker echo and increase the margin against acoustic instability.

DETAILED DESCRIPTION OF THE INVENTION

Figure 1:
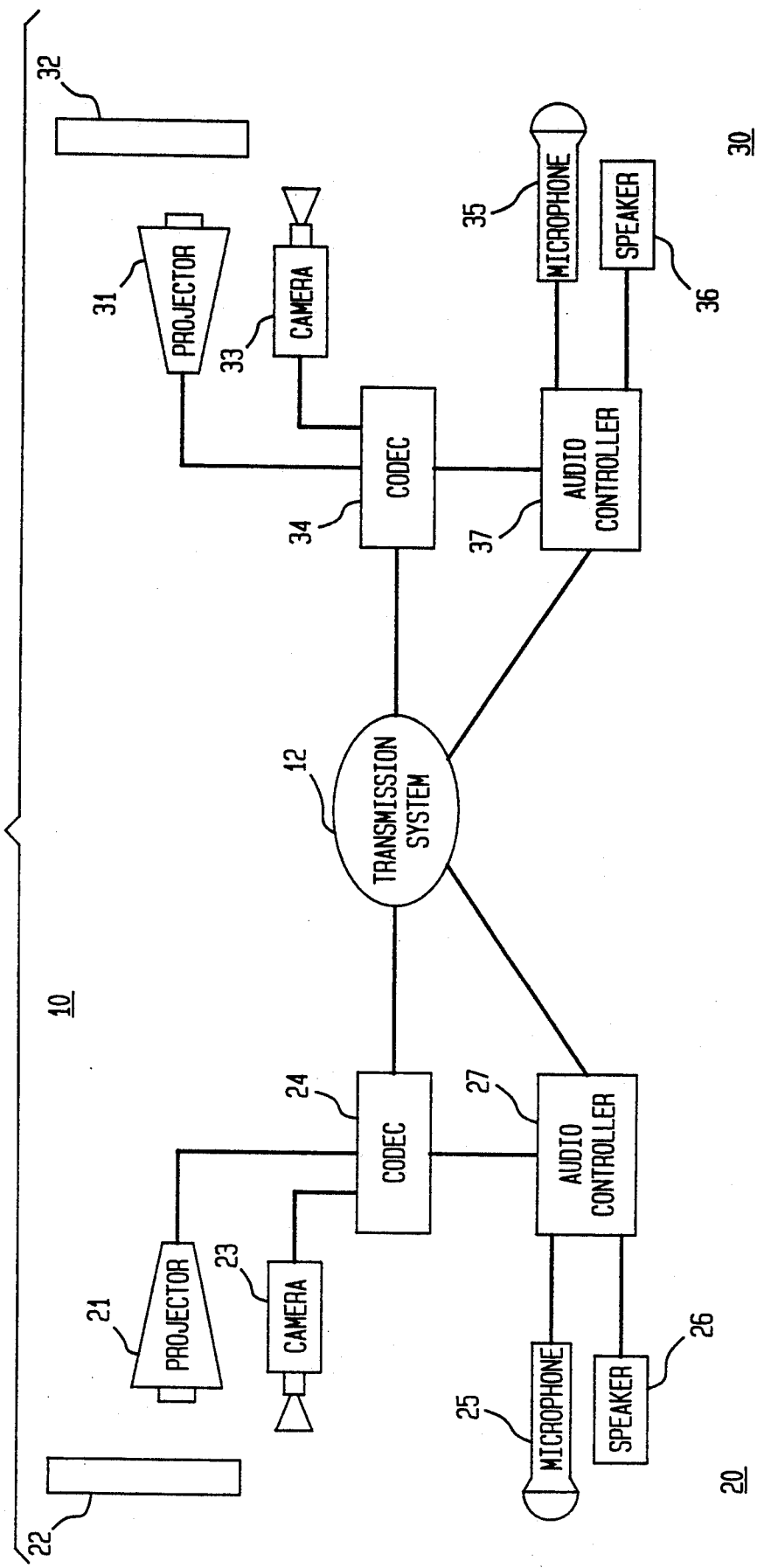
FIG. 1 schematically illustrates a teleconferencing system.

FIG. 1 illustrates a conferencing system with audio and video communication capabilities. The conferencing system 10 of FIG. 1 comprises at least two stations 20 and 30 which are remotely located from one another and interconnected by the transmission system 12.

For video communications, the station 20 includes the projector 21 for displaying a video image on the screen 22, the video camera 23 and the codec 24. Similarly, the station 30 includes a projector 31 for displaying a video image on a screen 32, a video camera 33 and a codec 34. The camera 23 generates a video signal at the station 20. The video signal is coded for compression by the codec 24 and transmitted via the transmission system 12 to the station 30. For example, the transmission system 12 may offer transmission facilities operating at DS1 or DS3 transmission rates which are North American telephone network digital transmission rates at 1.5 and 45 megabits per second, respectively. At the station 30, the video signal is decoded by the codec 34 and converted into an image by the video projector 31 for display on the screen 32. In a similar manner, the camera 33 at the station 30 generates a video signal for display at the station 20 by the projector 21 on the screen 22.

For audio communications, the station 20 includes the microphone 25, the amplified speaker 26 and the audio controller 27. Similarly, the station 30 includes the microphone 35, the amplified speaker 36, and the audio controller 37. To transmit speech from the station 20 to the station 30, the microphone 25 converts the speech into an audio signal. The audio controller 27 matches the processing delay of the audio signal to the processing delay introduced into video signal from the camera 23 by the codec 24. The audio controller 27 may also include one or more circuits for preventing acoustic instability and for eliminating echoes. The audio signal is transmitted through the transmission system 12 to the station 30. At the station 30, the audio signal is processed by the audio controller 37 to match delays introduced by the decoding operation of the codec 34 for the corresponding video signal. The audio signal is then converted back to acoustic form by the speaker 36. A similar process is utilized to transmit speech from the microphone 35 of the station 30 to the speaker 26 of the station 20.

Figure 2:
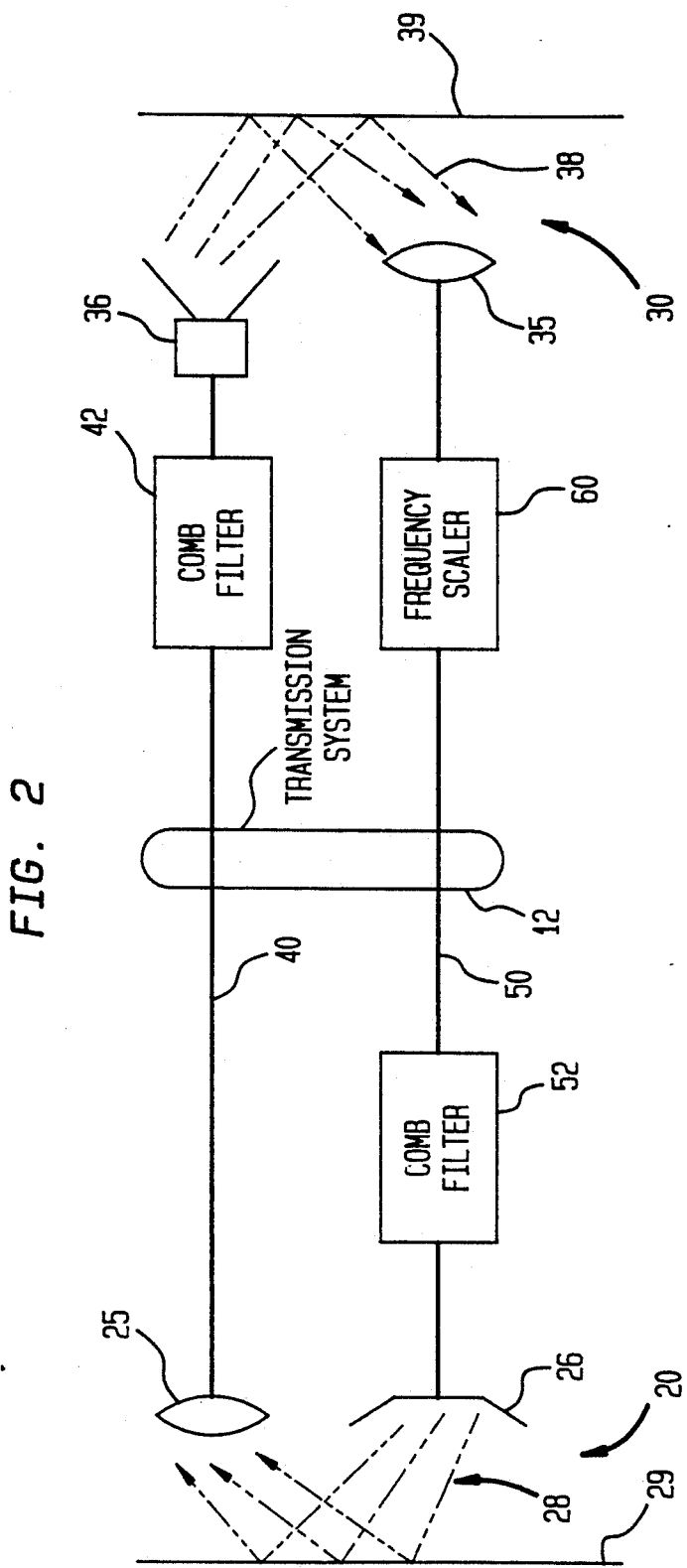
FIG. 2 schematically illustrates an audio processing system for use in the teleconferencing system of FIG. 1, in accordance with the present invention.

FIG. 2 schematically illustrates the acoustic feedback path which is incorporated in the teleconferencing system 10 of FIG. 1. As indicated above in connection with FIG. 1, the station 20 includes the microphone 25 and the speaker 26. The microphone 25 and speaker 26 are arranged for hands-free use by a teleconference participant at the station 20. Because the station 20 is located in a room, there is acoustic coupling between the speaker 26 and the microphone 25. Such acoustic coupling is represented in FIG. 2 by the acoustic paths 28 which illustratively include reflections or reverberations off a wall 29. Similarly, at the station 30 there is acoustic coupling between the speaker 36 and microphone 35 via the paths 38 which reflect off a wall 39.

As shown in FIG. 2, the microphone 25 at the station 20 is connected to the speaker 36 at the station 30 by the channel 40 which goes through the transmission system 12. Similarly, the microphone 35 at the station 30 is connected to the speaker 26 at the station 20 by the channel 50, which also goes through the transmission system 12. The channel 40 includes the comb filter 42. For illustrative purposes, the comb filter 42 is shown to be associated with station 30 located on channel 40 between speaker 36 and transmission system 12. The comb filter 42 may also be associated with station 20 and located between microphone 25 and transmission system 12 in the channel 40.

The channel 50 includes the comb filter 52. Illustratively, the comb filter 52 is shown in FIG. 2 to be located in channel 50 and associated with the station 20 at the input of the speaker 26. However, comb filter 52 could be associated with station 30 and located between the transmission system 12 and the microphone 35. A frequency scaler 60 is illustratively shown in FIG. 2 to be located in channel 50 and associated with station 30. However, the frequency scaler 60 could be located in channel 50 and associated with station 20 or in channel 40 and associated with station 20 or 30.

If the comb filter 42, the comb filter 52 and frequency scaler 60 were not present, there would be an acoustic feedback loop present in the audio processing system of FIG. 2. The acoustic feedback loop may be understood as follows. Consider speech which originates at the station 20. This speech is converted from acoustic form to an electronic audio signal by the microphone 25. The audio signal is then transmitted via the channel 40 to the speaker 36 at the station 30, where the audio signal is converted back onto acoustic form. The speech in acoustic form is then coupled via the acoustic paths 38 to microphone 35 where it is converted back into an electronic audio signal and transmitted via the channel 50 to the speaker 26 at the station 20. The speaker 26 converts the electronic audio signal back into acoustic form and the speech is transmitted via the acoustic paths 28 back to the microphone 25. If the roundtrip gain of the loop is greater than unity, acoustic instability results. Even if the roundtrip gain is less than unity, the speaker at the station 20 may hear an echo at the station 20. The greater the audio processing delays, the more distinguishable is the echo for the speaker at the station 20.

To provide a margin against acoustic instability, and to suppress the far-end echo, the channel 40 includes the comb filter 42 and the channel 50 includes the comb filter 52 and frequency scaler 60.

Figure 3A:
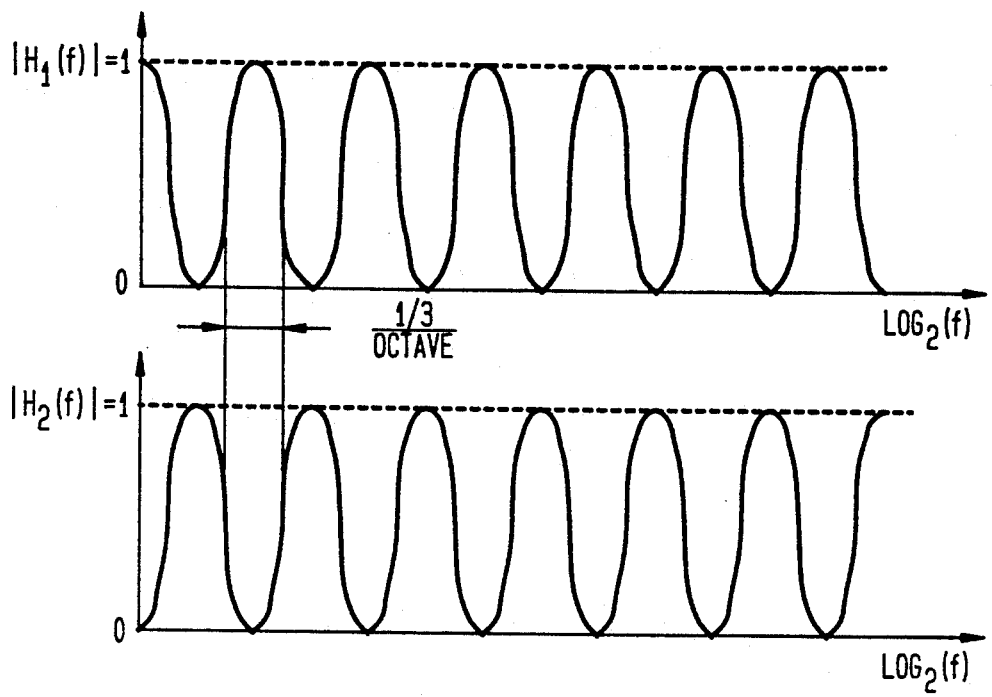
FIG. 3A illustrates the transfer functions of a pair of complementary comb filters for use in the audio processing system of FIG. 2.

The transfer function $H_1(f)$ of the comb filter 42 and the transfer function $H_2(f)$ of the comb filter 52 are illustrated in FIG. 3A. The transfer functions $H_1(f)$ and $H_2(f)$ comprise alternating passbands and stop bands. The transfer functions $H_1(f)$ and $H_2(f)$ are complementary in that the passbands of one transfer function overlap in frequency the stopbands of the other transfer function and vice versa. The depth of the nulls in the transfer functions is preferably 12 dB. The transfer function extends over a frequency range on the order of 8 KHz and the peak-to-peak spacing in the transfer functions is one-third of an octave. Nulls which are too deep (e.g., nulls deeper than 12 dB) introduce noticeable impairment in the quality of transmitted speech.

The comb filters 42 and 52 mitigate the effects of acoustic coupling between the speaker and the microphone at each station. As indicated above, the reason is that any signal going around the feedback loop is processed by both comb filters and will be attenuated across its entire spectrum as the stopbands of the two comb filters are complementary. For the same reason, echoes transmitted back to the near-end station resulting from acoustic coupling between the speaker and microphone at the far-end station are also reduced. On the other hand, a signal which travels from the microphone at one station to the speaker at the other station is processed by only one comb filter so that it is not attenuated across its entire spectrum.

Figure 4:
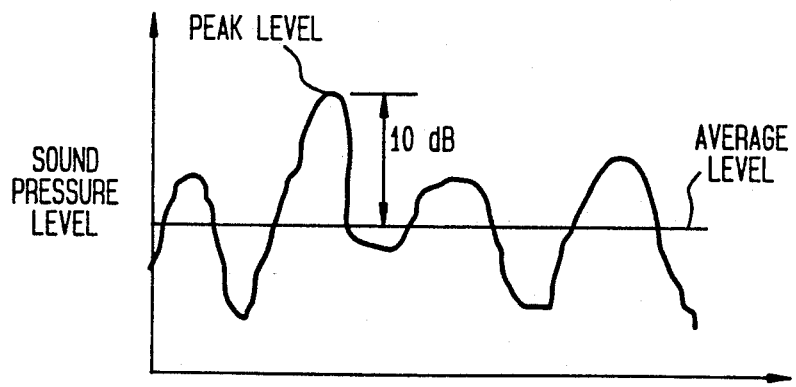
FIG. 4 illustrates the acoustic response function of a room in which a station of the teleconferencing system of FIG. 1 is located.

Because the depth of the nulls in the transfer functions of the comb filters 42 and 52 is limited, the comb filters by themselves do not provide an adequate margin against acoustic instability. The reason for this is the frequency response of the room in which the station 20 or station 30 is located. The acoustic frequency response of such a room is illustrated in FIG. 4. In particular, FIG. 4 plots sound pressure level versus frequency for a typical room containing a teleconferencing station.

As can be seen in FIG. 4, the acoustic frequency response includes many resonances having peaks which far exceed average sound levels. These resonances are not suppressed enough by the comb filters to provide an adequate stability margin.

Figure 3B:
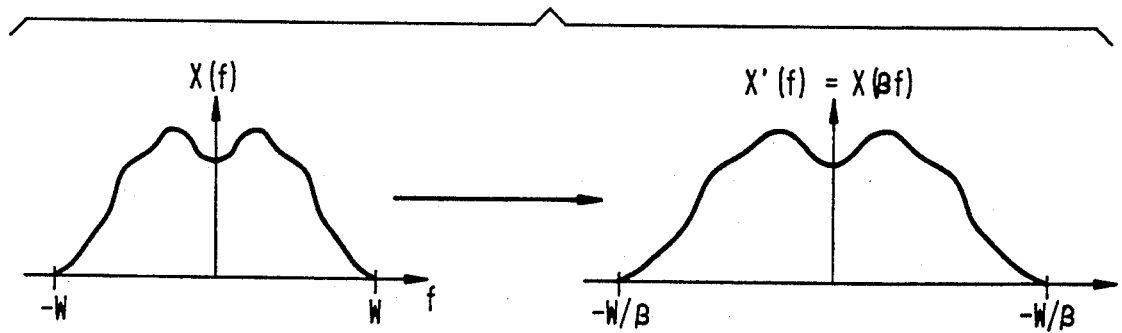
FIG. 3B illustrates the frequency scaling operation.

The frequency scaler 60 scales the frequency spectrum of a signal by transforming an input signal with a spectrum $X(f)$ into an output signal with a spectrum $X'(f) = X(\beta f)$. This frequency scaling operation is illustrated in FIG. 3B. Illustratively, the constant factor $\beta$ is greater than one and is in a range of approximately 1.01 to 1.03. At DS-3 rates, the use of a frequency scaler in one of the channel paths 40 or 50 of FIG. 2, permits an additional 6–9 dB of audio amplitude without acoustic instability. The combined processing of the comb filters 42 and 52 and the frequency scaler 60 results in a total stability margin of about 18 dB and an Echo Return Loss Enhancement of 22 dB.

The frequency scaler 60 serves to break up the acoustic resonances of the teleconferencing station room by scaling the frequency spectrum by a factor $\beta$ for a roundtrip so as to move particular frequency components in the audio signal outside of room resonant peaks. Thus, a frequency component of a signal, which is at a resonant frequency of a room containing station 30 and which enters the microphone 35 of FIG. 2, has its frequency scaled by the frequency scaler 60 so that when it traverses the path around the loop and returns to station 30 via speaker 36 it is no longer at a resonant frequency.

The audio processing system of FIG. 2 is suitable for use in low delay (less than 50 msec) transmission systems. At such low delays, echo is not as serious a problem as in longer delay systems therefore allowing the use of relatively shallow comb filters. Because shallow comb filters do not degrade speech quality to an extremely large degree the audio processing system of FIG. 2 has shallow comb filters inserted permanently into the return audio path leading to each speaker. In larger delay systems, where far-end echoes are a more serious problem, deeper comb filtering may be utilized to achieve greater echo suppression and an increased margin against acoustic instability. This depth of filtering, however, impairs the quality of transmitted speech. Hence, the comb filters of a long delay audio processing system are preferably not permanently inserted into the return audio path leading to each speaker.

Figure 5:
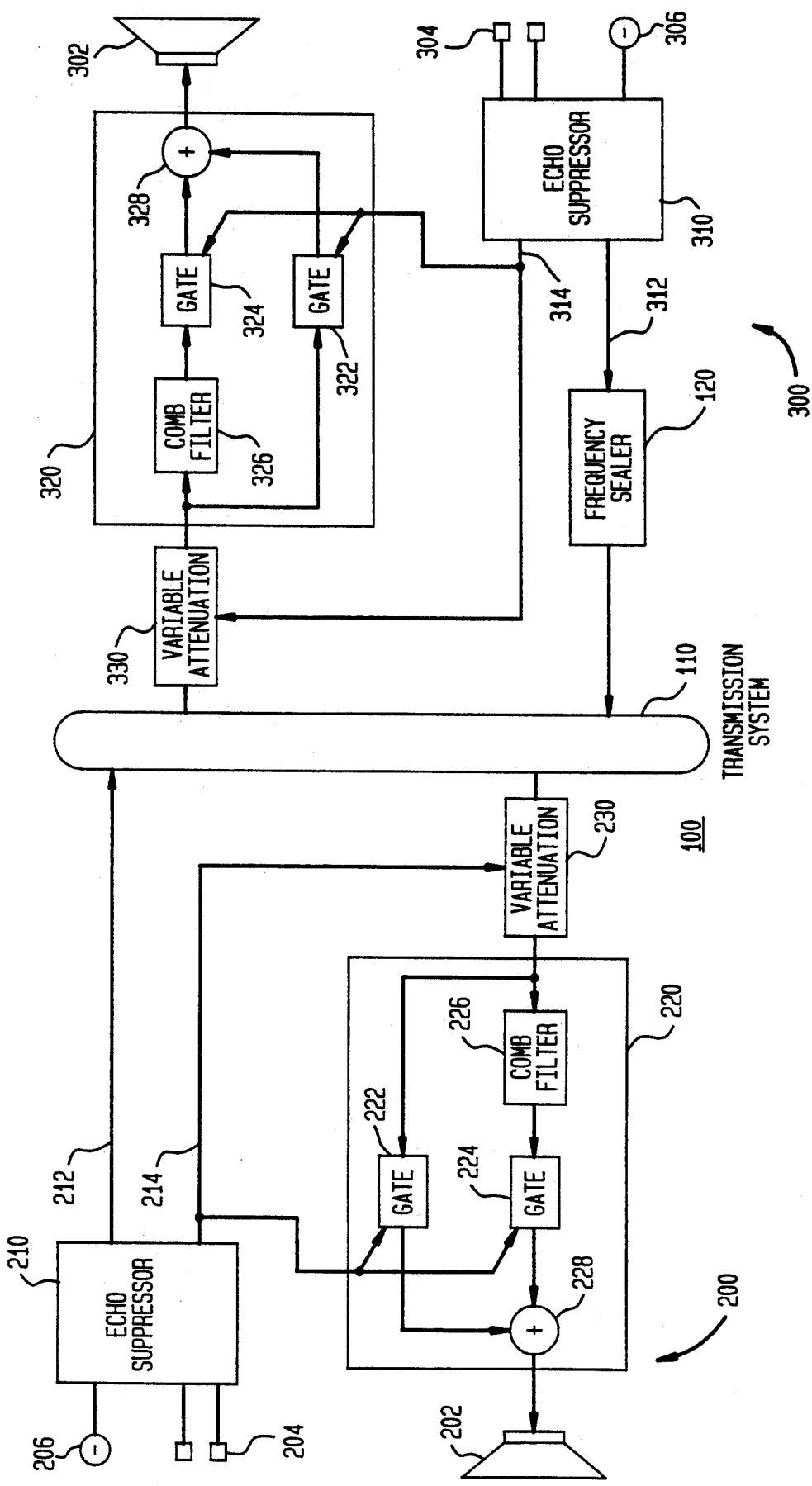
FIG. 5 illustrates an alternative audio processing system for use in the teleconferencing system of FIG 1, in accordance with the present invention.

An alternative embodiment of an audio processing system for a teleconferencing system is illustrated in FIG. 5. The system 100 of FIG. 5 comprises the station 200 and the station 300. The station 200 and the station 300 are interconnected by a transmission system 110. The station 200 comprises the amplified speaker 202 and one or more microphones 204. Similarly, the station 300 comprises the amplified speaker 302 and one or more microphones 304. The purpose of the system 100 is to transmit speech signals from the microphones 204 of the station 200 to the speaker 302 of the station 300 and to transmit speech signals from the microphones 304 of the station 300 to the speaker 20 of the station 200 without echoes and acoustic instability.

To eliminate acoustic instabilities and suppress echoes, the station 200 includes the echo suppressor 210, the dynamic filter 220, and the variable attenuator 230. Similarly, the station 300 includes the echo suppressor 310, the dynamic filter 320 and the variable attenuator 330.

The echo suppressors 210 and 310 are implemented by gating systems. Each echo suppressor 210, 310 operates in response to the presence of local speech. When the local speech is present, the echo suppressor is in the pass state. When no local speech is present, the echo suppressor is in the blocking state. One problem with this type of gating, especially in noisy rooms, is "noise pumping". Noise pumping occurs when room background noise is alternately transmitted to the far end and blocked as a result of the local echo suppressor switching from the pass state to the blocking state. This is an undesirable effect for a listener at the far end.

To circumvent this problem, a periodically updated replica of room noise 206, 306 is fed to one input of each echo suppressor 210, 310. The other inputs 204, 304 are microphones which pick up local speech. When any of the inputs 204 or 304 become active due to local speech, the echo suppressor 210 or 310 automatically attenuates each of its microphone inputs to keep its total output from all of the inputs constant. This arrangement eliminates noise pumping caused by the gating action of the echo suppressor.

The echo suppressors 210 and 310 each have two outputs, 212 and 214, and 312 and 314, respectively. When an echo suppressor 210 or 310 is in the pass state, the output 212 or 312 is the combination of all the inputs and the output 214 or 314 is the combination of the microphone inputs 204 or 304. Echo suppressors which operate in this manner can be implemented by automatic gating mixer systems which are commercially available.

The output 212 of the echo suppressor 210 and the output 312 of the echo suppressor 310 are connected via the transmission system 100 to the other station. The outputs 214 and 314 are connected to the dynamic filters 220 and 320, respectively, to control these filters.

The dynamic filter 220 comprises a first gate 222, a second gate 224, a comb filter 226 and a multiplexer 228. Similarly, the dynamic filter 320 comprises a first gate 322, a second gate 324, a comb filter 326 and a multiplexer 328.

The dynamic filter 220 operates as follows. When the signal level at the output 214 exceeds a threshold level, the gate 222 is opened, the gate 224 is closed and the comb filter 226 is bypassed. When signal level at the output 214 is below the threshold, the gate 224 is open and the gate 222 is closed so that the comb filter is connected to an input of the speaker 202 via the multiplexer 228. Similarly, for the filter 320, the comb filter 326 is bypassed or connected via the multiplexer 328 to the speaker 302 depending on the signal level at the echo suppressor output 314 that is applied to the gates 322 and 324. The comb filters 226 and 326 are complementary.

It should be noted that if there is speech at only one end of the teleconference, a comb filter is inserted into a channel that is already blocked by an echo suppressor at the far end. Thus, in this case the role of the comb filter is not particularly important.

The use of the comb filters 226 and 326 is most important when a double talk condition exists. In the double talk condition, neither echo suppressor 210 and 310 is in the blocking state and the possibility for echo and acoustic instability exists. In this case, both comb filters 226 and 326 are activated at the same time. Because the comb filters 226 and 326 are complementary and a signal is processed by both comb filters during a trip around the feedback loop, attenuation of the undesired return signal occurs across its entire spectrum. Because each participant hears the non-echo desired speech signal from the far end through a comb filter only during the existence of a double talk condition, most of the degradation in speech quality that results from the use of a comb filters is eliminated.

In order to remove any residual acoustic echo a variable attenuator 230 is connected in series with the filter 220 and a variable attenuator 330 is connected in series with the filter 320. The variable attenuators 230 and 330 are activated when a threshold signal level is surpassed at the echo suppressor outputs 214 and 314, respectively. As in the case of the comb filters 226 and 326, the variable attenuators 230 and 330 are only effective during a double talk condition.

In addition, a frequency scaler 120 may be included in one of the channels of the system 100 to scale the frequency spectrum of a signal propagating in that channel to override any strongly peaked acoustical resonances. For example, the frequency scaler 120 may be connected to the output 312 of the echo suppressor 310.

In short, an audio processing system for a teleconferencing system has been disclosed. The audio processing system reduces far-end echo and increases the margin against acoustic instability. Finally, the above-described embodiments of the invention are intended to be illustrative only. Numerous alternative embodiments may be devised by those skilled in the art without departing from the spirit and scope of the following claims.

We claim:

1. A teleconferencing system comprising
   a first station including first microphone means and first speaker means,
   a second station remotely located from the first station and including second microphone means and second speaker means,
   a first audio channel connecting said first microphone means with said second speaker means and a second audio channel connecting said second microphone means with said first speaker means,
   first and second comb filters having complementary pass and stop bands located in said first and second channels, respectively, for attenuating echoes which are signals coupled between said first speaker means and said first microphone means and between said second speaker means and said second microphone means,
   a first echo suppressor connected to said first microphone means for selectively blocking said first channel when no speech is present at said first station and for opening said first channel when speech is present at said first station,
   a second echo suppressor connected to said second microphone means for selectively blocking said second channel when no speech is present at said second station and for opening said second channel when speech is present at said second station,
   and means connected to said second and first echo suppressors for selectively activating said first and second comb filters, respectively.

2. The teleconferencing system of claim 1 wherein said activating means comprises
   first switch means responsive to said first echo suppressor for activating said second comb filter when said first channel is open and second switch means responsive to said second echo suppressor for activating said first comb filter when said second channel is open.

3. The teleconferencing system of claim 2 further comprising
   first variable attenuation means located in said first channel for inserting variable attenuation in said first channel, said first variable attenuation means being activated by an above threshold signal from said second echo suppressor, and
   second variable attenuation means located in said second channel for inserting a variable attenuation in said second channel, said second variable attenuation means being activated by an above threshold signal from said first echo suppressor.

4. A teleconferencing system comprising
   a first station including a first microphone and a first speaker,
   a second station including a second microphone and a second speaker,
   a first audio transmission channel for connecting said first microphone with said second speaker and a second audio transmission channel for connecting said second microphone with said first speaker,
   a fist echo suppressor connected to said first microphone for switching said first channel between a passing state and a blocking state,
   a second echo suppressor connected to said second microphone for switching said second channel between a passing state and a blocking state,
   a first comb filter located in said second channel,
   means responsive to said first echo suppressor for activating said first comb filter when said first channel is in a passing state,
   a second comb filter located in said first channel, and
   means responsive to said second echo suppressor for activating said second comb filter when said second channel is in a passing state, said first and second comb filters having complementary pass and stop bands.

5. The teleconferencing system of claim 4 further comprising
   means for bypassing said first comb filter when said first echo suppressor is in a blocking state, and
   means for bypassing said second comb filter when said second echo suppressor is in a blocking state.

6. The teleconferencing system of claim 4 further comprising
   first variable attenuation means located in said second channel and operable under the control of said first echo suppressor, and
   second variable attenuation means located in said first channel and operable under the control of said second echo suppressor.

7. The teleconferencing system of claim 2 further comprising a frequency scaler located in one of said channels for scaling the frequency spectrum of a signal in said one channel.

8. The teleconferencing system of claim 4 further comprising
   a frequency scaler located in one of said channels for scaling by a constant factor the frequency spectrum of a signal in said one channel.

* * * * *